Patented Jan. 16, 1951

2,538,610

UNITED STATES PATENT OFFICE 2,538,610

MONOAZO DYESTUFFS

Willi Widmer, Bottmingen, and Rudolf Ruegg, Basel, Switzerland, assignors to Ciba Limited, Basel, Switzerland No Drawing. Application September 7, 1948, Serial No. 48,152. In Switzerland September 24, 1947

2 Claims. (Cl. 260—198)

According to this invention valuable new monoazo-dyestuffs are made by coupling a diazo-compound of an amine of the general formula

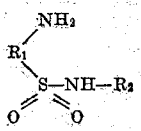

in which $R_1$ represents an aromatic nucleus of the benzene series, and $R_2$ represents an aliphatic hydrocarbon radical of 8–12 carbon atoms, with a coupling component containing a sulfonic acid group.

The amines of the above general formula can be obtained by methods in themselves known from compounds of the general formula

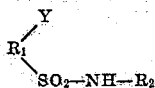

in which $R_1$ and $R_2$ have the meanings given above and Y represents a substituent convertible into an —$NH_2$ group, by converting the substituent Y into an —$NH_2$ group. The compounds of the last mentioned formula can be obtained by condensing by a method in itself known a compound of the general formula $R_1$—$SO_2X$, in which $R_1$ represents an aromatic nucleus of the benzene series, and X represents a halogen atom or a reactive radical with an amine of the general formula $H_2N$—$R_2$ (in which $R_2$ represents an aliphatic hydrocarbon radical of 8–12 carbon atoms) and, when the radical $R_1$ contains no substituent convertible into an —$NH_2$ group, introducing such a substituent into the radical $R_1$ after the condensation.

One form of the above described process for making such intermediate products is, for example, the following: A nitrobenzene sulfonic acid halide or an acylaminobenzene sulfonic acid halide is condensed with an aliphatic amine containing 8–12 carbon atoms, and the nitro group present in the condensation product is reduced to an —$NH_2$ group or the acylamino group is hydrolysed. The condensation may be conducted in an anhydrous or aqueous medium, and is advantageously carried out in the presence of an agent capable of binding acid, for example, a tertiary base such as pyridine. Nitro- or acylamino-benzene sulfonic acid halides may be used as starting materials, which contain no further substituents in the benzene nucleus or which contain further substituents, for example, halogen atoms, such as chlorine, or alkoxy groups such as ethoxy or especially methoxy groups. If desired, additional substituents may be introduced into the benzene nucleus after the aforesaid condensation, or substituents already present may be replaced by or converted into other substituents.

The amines of the general formula first mentioned above, which are used as starting materials for making the azo-dyestuffs of the invention, contain as the radical $R_2$ an aliphatic hydrocarbon radical of 8–12 carbon atoms. This aliphatic radical may also contain cyclic bonds. There may be mentioned the following radicals: octyl, nonyl, decyl, undecyl or dodecyl groups.

As examples of amines of the general formula first given above there may be mentioned the following (in this list the sulfonalkylamide group denotes an —$SO_2NHC_nH_{2n+1}$ group, in which the alkyl group —$C_nH_{2n+1}$ is advantageously an unbranched alkyl group, and $n$ is greater than 7 and less than 13, for example, a sulfon-n-octyl-amide, a sulfon-n-decyl- or dodecyl-amide etc., see the last sentence of the preceding paragraph):

3- or 4-aminobenzene-1-sulfonalkylamides,
4-alkoxy- (for example, ethoxy- or methoxy)-3-aminobenzene-1-sulfonalkylamides,
3-alkoxy- (for example, methoxy-)-4-aminobenzene-1-sulfonalkylamides,
6-chloro-3-aminobenzene-1-sulfonalkylamides,
4-methyl-3-aminobenzene-1-sulfonalkylamides, and
6-methyl-3-aminobenzene-1-sulfonalkylamides.

The monoazo-dyestuffs obtainable by the invention contain one or more sulfonic acid groups.

The coupling components used for making these dyestuffs may, in other respects, be any desired kind. They may owe their capacity for coupling, for example, to an aromatic grouping or to a reactive keto-methylene group.

Especially valuable products are obtained by using as coupling components hydroxynaphthalene disulfonic acids capable of coupling in a position vicinal to a hydroxyl group or aminonaphthalene sulfonic acids capable of coupling in a position vicinal to an amino group or 1-phenyl-3-methyl-5-pyrazolones containing sulfonic acid groups.

As examples of coupling components suitable for making monoazo-dyestuffs by the present invention there may be mentioned:

Compounds of the naphthalene series

Hydroxynaphthalene monosulfonic acids such as 1-hydroxynaphthalene-4-sulfonic acid, hydroxynaphthalene disulfonic acids such as 1:3:6-, 1:3:8-, 1:4:8-, 2:3:6-, or 2:6:8-hydroxynaphthalenedisulfonic acid; aminonaphthalene monosulfonic acids such as 2:6-, 2:7- or 2:8-aminonaphthalenesulfonic acid; aminonaphthalenedisulfonic acids such as 2:4:7-, 2:5:7- or 2:6:8-aminonaphthalenedisulfonic acid; amino-, alkylamino-, arylamino or acylamino - hydroxynaphthalene sulfonic acids and disulfonic acids such as 2:8:6-, or 2:6:8 - amino-hydroxynaphthalene sulfonic acid, 1-phenyl-amino-8-hydroxynaphthalene-4-sulfonic acid, 2:5:7- or 2:8:6-acetylamino-hydroxynaphthalene sulfonic acid; 1-acetylamino-, 1-benzoylamino-, 1-para-toluene-sulfonylamino-, 1-phenoxy-acetylamino- or 1-(2'-chloro-phenoxy) - acetylamino-8-hydroxynaphthalene-3:6-disulfonic acid; 1-acetylamino- or 1-para-toluene - sulfonylamino-8-hydroxynaphthalene-4:6-disulfonic acid.

Pyrazolones 1-(3'- or 4' sulfo)-phenyl-3-methyl-5-pyrazolone;
1-(2'-methyl-4'-sulfo)-phenyl-3-methyl - 5 - pyrazolone;
1-(2'-chloro-4'-sulfo)-phenyl-3-methyl - 5 - pyrazolone;
1-(2'-chloro-5'-sulfo)-phenyl-3-methyl - 5 - pyrazolone;
1-(2':5'-disulfo)-phenyl- 3 - methyl - 5 - pyrazolone;
1-(8'-sulfo-2'-naphthyl)-3-methyl - 5 - pyrazolone;
1-(3'-sulfophenyl)-5 - pyrazolone - 3 - carboxylic acid.

The amines of the formula first mentioned above may be diazotized by methods in themselves known. The diazotization is advantageously conducted in the presence of a suitable solution promoter, for example, ethyl alcohol.

The coupling of the diazo-compounds may be carried out in an acid, neutral or alkaline medium, the most advantageous reaction conditions for coupling in any particular case depending to a great extent on the nature of the coupling component used.

The azo-dyestuffs obtainable by the invention are new. They contain at least one sulfonic acid group and correspond to the general formula

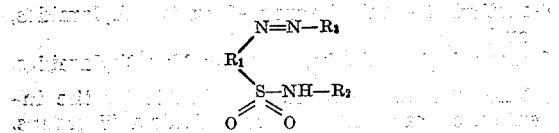

in which $R_1$ represents an aromatic nucleus of the benzene series, $R_2$ represents an aliphatic hydrocarbon radical of 8-12 carbon atoms, and $R_3$ represents the radical of a coupling component. They can be used for dyeing or printing a very wide variety of materials.

These monoazo-dyestuffs containing a sulfonic acid group are suitable principally for dyeing animal fibers such as leather, silk and especially wool; and also for dyeing artificial fibers of superpolyamides or superpolyurethanes. The dyeings obtainable therewith are distinguished by the very special purity and brightness of their tints, and also by very good properties of fastness to alkali and washing.

The following examples illustrate the invention, the parts being by weight:

Example 1

7.5 parts of 4-methoxy-3-aminobenzene-1-sulfon-n-dodecylamide are dissolved in 30 parts of hot ethyl alcohol and, after cooling it to about 40° C., the solution is mixed with 7 parts of hydrochloric acid of 30 per cent. strength. A saturated solution of 1.4 parts of sodium nitrite is introduced dropwise at 10-15° C.

The diazo solution so obtained is coupled at 0° C. with a solution of 6 parts of the sodium salt of 1-(2'-chloro-5'-sulfo)-phenyl-3-methyl-5-pyrazolone in 60 parts of a saturated solution of sodium carbonate. When the coupling is finished the yellow dyestuff is removed from the coupling mixture and dried. It is a yellow powder which dyes wool pure yellow tints from an acetic acid bath. The dyeings are distinguished by very good properties of fastness to alkali and washing.

By using 1-(2':5'-disulfo)-phenyl-3-methyl-5-pyrazolone, instead of 1-(2'-chloro-5'-sulfo)-phenyl-3-methyl-5-pyrazolone, a dyestuff having similar properties is obtained. The 4-methoxy-3 - aminobenzene-1-sulfon-n-dodecylamide used as a starting material in this example may be prepared, for example, in the following manner:

4-methoxy-3-nitrobenzene-1-sulfonyl chloride is condensed in the presence of pyridine with n-dodecylamine, and the resulting 4-methoxy-3-nitrobenzene-1-sulfon-dodecylamide is reduced in alcoholic solution with iron and hydrochloric acid to form 4-methoxy-3-aminobenzene-1-sulfon-n-dodecylamide.

Example 2

A diazo solution prepared from 7.5 parts of 4-methoxy-3-aminobenzene-1-sulfon - n - dodecylamide obtained as described in the first paragraph of Example 1 is coupled at 0° C. with a solution of 7 parts of the disodium salt of 2-hydroxynaphthalene-6:8-disulfonic acid in 60 parts of a saturated solution of sodium carbonate, and the coupling is brought to completion by the addition of a small quantity of sodium hydroxide solution. The dyestuff is precipitated by the addition of sodium chloride, removed by filtration and dried. It is a red powder which dyes wool very pure orange tints from acetic acid baths. The dyeings are distinguished by very good properties of fastness to alkali and washing.

Example 3

A diazo solution prepared from 7.5 parts of 4-methoxy-3-aminobenzene-1-sulfon-n-dodecylamide as described in the first paragraph of Example 1 is coupled at 0° C. with a solution of 7 parts of the di-sodium salt of 1-hydroxynaphthalene-3:6-disulfonic acid in 60 parts of a saturated solution of sodium carbonate. When the coupling is finished the dyestuff is removed by filtration and dried. It is a red powder which dyes wool very pure yellowish red tints from an acetic acid bath. The dyeings are distinguished by very good properties of fastness to alkali and washing.

By using 1-hydroxynaphthalene - 4 - sulfonic acid, instead of 1-hydroxynaphthalene-3:6-disulfonic acid, a dyestuff having similar properties is obtained.

Example 4

A diazo solution prepared from 7.5 parts of 4-methoxy-3-aminobenzene-1- sulfon-n-dodecylamide as described in the first paragraph of Example 1 is coupled at 0° C., with a solution of 10.7 parts of the disodium salt of 1-para-toluene-sulfonylamino-8-hydroxynaphthalene-3:6- disulfonic acid in 60 parts of a saturated solution of sodium carbonate. After a few hours the coupling is complete. The dyestuff is removed by filtration and dried. It is a red powder which dyes wool very pure bluish-red tints from an acetic acid bath.

By using 4-methyl-3-amino-1-sulfon-n-dodecylamide, instead of 4-methoxy-3-methylbenzene-1-sulfon-n-dodecylamide, a dyestuff is obtained which yields somewhat more yellow tints on wool.

Example 5

34 parts of 3-aminobenzene-1-sulfon-n-dodecylamide are dissolved in 80 parts of hot ethyl alcohol and mixed at the boiling point with a concentrated aqueous solution of 7.5 parts of sodium nitrite. The solution, which is homogeneous when hot, is introduced dropwise at a temperature below 10° C. into a mixture of 67 parts of hydrochloric acid of 30 per cent. strength and 200 parts of ethyl alcohol. After dilution with water there is obtained a clear somewhat brownish colored diazo solution which is then stirred with 2 parts of urea for 1 hour at 10-20° C. in order to decompose the excess of nitrous acid.

The diazo solution obtained in the above manner is coupled at 0° C. with a solution of 28 parts of the sodium salt of 1-(4'-sulfo)-phenyl-3-methyl-5-pyrazolone in 500 parts of a saturated solution of sodium carbonate. The yellow dyestuff which forms immediately is removed by filtration after a few hours, and is then dissolved in hot water. The aqueous solution is filtered, if necessary, and then mixed with sodium chloride until the greater part of the dyestuff has precipitated. The dyestuff is removed by filtration and dried. A yellow powder is obtained which dissolves in hot water with a reddish yellow coloration and dyes wool reddish yellow tints which, besides being very level, have very good properties of fastness to washing and light.

By using 6-methyl-3-aminobenzene-1-sulfon-n-dodecylamide, instead of 3-aminobenzene-1-sulfon-n-dodecylamide, a dyestuff having similar properties is obtained.

Example 6

36 parts of 6-methyl-3-aminobenzene-1-sulfon-n-dodecylamide are dissolved in 80 parts of hot ethyl alcohol and mixed at a raised temperature with a concentrated aqueous solution of 7.5 parts of sodium nitrite. The homogeneous solution is introduced dropwise, while thoroughly stirring and cooling below 10° C. into a mixture of 160 parts of ethyl alcohol and 67 parts of hydrochloric acid of 30 per cent. strength. Upon dilution with water a clear diazo solution is obtained which is stirred for 1 hour longer at 10-20° C. with 2 parts of urea.

The diazo solution so obtained is coupled at 0° C. with a solution of 38 parts of the disodium salt of 1-(2':5'-disulfo)-phenyl-methyl-5-pyrazolone in 500 parts of a saturated solution of sodium carbonate. The yellow dyestuff which forms immediately is isolated after a few hours by the addition of sodium chloride and dried. The dyestuff is obtained in the form of a brownish orange resinous mass, which dissolves in water with a green yellow coloration. From an acetic acid bath this dyestuff dyes wool level green yellow tints having very good properties of fastness to washing and light.

By using 1-(2'-chloro-5'-sulfo)-phenyl-3-methyl-5-pyrazolone, instead of 1-(2':5'-disulfo)-phenyl-3-methyl-5-pyrazolone, a dyestuff having similar properties is obtained.

Example 7

36 parts of 4-methyl-3-aminobenzene-1-sulfon-n-dodecylamide are dissolved in 80 parts of hot ethyl alcohol and mixed at a raised temperature with a concentrated aqueous solution of 7.5 parts of sodium nitrite. The homogeneous solution is introduced, while thoroughly stirring and cooling below 10° C., into a mixture of 160 parts of ethyl alcohol and 67 parts of hydrochloric acid of 30 per cent. strength. Upon dilution with water there is obtained a clear reddish diazo solution, which is stirred for 1 hour longer at 10-20° C. with 2 parts of urea.

The resulting diazo solution is mixed at 0° C. with a solution of 35 parts of the disodium salt of 2-hydroxynaphthalene-6:8-disulfonic acid in 500 parts of a saturated solution of sodium carbonate. The resulting red orange dyestuff is isolated after a few hours and dissolved in hot water. The solution is filtered to remove small quantities of impurities, if desired, and then mixed with a sufficient quantity of sodium chloride to reprecipitate the bulk of the dyestuff. The dyestuff is removed by filtration and dried. A red powder is obtained which dissolves in water with an orange coloration and dyes wool yellow orange tints from an acetic acid bath.

By using 3-aminobenzene-1-sulfon-n-dodecylamide, instead of 4-methyl-3-aminobenzene-1-sulfon-n-dodecylamide a dyestuff having similar properties is obtained.

Example 8

37.5 parts of 6-chloro-3-aminobenzene-1-sulfon-n-dodecylamide are dissolved in 75 parts of ethyl alcohol at a raised temperature, and then mixed with a concentrated aqueous solution of 7.5 parts of sodium nitrite. The homogeneous solution is introduced, while thoroughly stirring and cooling below 0° C., into a mixture of 120 parts of ethyl alcohol and 67 parts of hydrochloric acid of 30 per cent. strength. Upon dilution with water a clear diazo solution is obtained which is stirred with 2 parts of urea prior to coupling.

The resulting diazo solution is coupled at 0° C. with a solution of 28 parts of the sodium salt of 1-(4'-sulfo)-phenyl-3-methyl-5-pyrazolone in 500 parts of a saturated solution of sodium carbonate. The yellow dyestuff which forms immediately is removed by filtration after a few hours and then dissolved in hot water. The solution is filtered and the dyestuff is precipitated by the addition of sodium chloride, removed by filtration and dried. A yellow powder is obtained which dissolves in water with a yellow coloration and dyes wool from an acetic acid bath yellow tints which are very fast to washing.

Example 9

29 parts of 3-aminobenzene-1-sulfon-n-octylamide are dissolved in 80 parts of hot alcohol and mixed with a saturated aqueous solution of 7.5 parts of sodium nitrite. The solution is introduced dropwise at a temperature below 10° C. into a mixture of 160 parts of ethyl alcohol and 67 parts of hydrochloric acid of 30 per cent. strength. The alcoholic diazo solution is mixed with a solution of 2 parts of urea in 200 parts of water and the whole is stirred at 15° C. until an excess of nitrous acid is no longer present.

27 parts of the sodium salt of 2-amino-8-hydroxy-naphthalene-6-sulfonic acid are dissolved in 250 parts of water and then introduced dropwise in the course of 1 hour at 20° C. into the diazo solution described above. After 20 hours the crude dyestuff which precipitates is isolated, dried and dissolved in 200 parts of ethyl alcohol. The deep red solution is filtered to remove impurities, the alcohol being distilled off by the introduction of steam. After the addition of sodium chloride the dyestuff is removed by filtration and dried. A red powder is obtained which dissolves in water with a red coloration and dyes wool fast red tints.

By using 3-aminobenzene-1-sulfon-n-decyl-amide instead of 3-aminobenzene-1-sulfon-n-octylamide a dyestuff having similar properties is obtained.

By using 2-amino-naphthalene-6-sulfonic acid instead of 2-amino-8-hydroxynaphthalene-6-sulfonic acid, there is obtained a yellow orange dyestuff which dyes wool fast yellow orange tints.

*Example 10*

A diazo solution prepared in the manner described in the preceding example from 29 parts of 3-aminobenzene-1-sulfon-n-octylamide is mixed at 0° C. with a solution of 32 parts of the sodium salt of 1-(2'-chloro-5'-sulfo)-phenyl-3-methyl-5-pyrazolone in 500 parts of a saturated solution of sodium carbonate. The yellow dyestuff is precipitated after a few hours by the addition of acetic acid and removed by filtration. When dry it is a yellow powder which dyes wool green yellow tints from an acid bath.

*Example 11*

1.5 parts of the dyestuff obtained as described in the first paragraph of Example 3 are dissolved in 4000 parts of water, 10 parts of crystalline sodium sulfate are added to the dyebath, and 100 parts of well wetted wool are entered at 40–50° C. There are then added 4 parts of acetic acid of 30 per cent. strength, the whole is brought to the boil in the course of 30 minutes and dyeing is carried on for 45 minutes at the boil. The wool is then rinsed and dried. It is dyed a very pure scarlet red tint.

What is claimed is:
1. A monoazo dyestuff of the formula

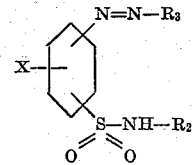

in which X stands for a member selected from the group consisting of hydrogen, chlorine, methyl and methoxy, $R_2$ stands for an aliphatic hydrocarbon radical of 8 to 12 carbon atoms, and $R_3$ stands for the radical of an aminonaphthalene sulfonic acid bound to the azo group in a position vicinal to the amino group.

2. The monoazo-dyestuff which in its free acid state corresponds to the formula

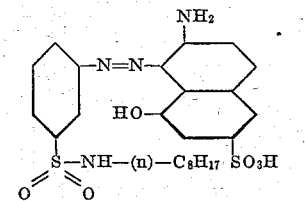

WILLI WIDMER.
RUDOLF RUEGG.

REFERENCES CITED

The following references are of record in the file of this patent:

UNITED STATES PATENTS

| Number | Name | Date |
| --- | --- | --- |
| 1,903,600 | Schweitzer | Apr. 11, 1933 |
| 2,075,076 | Zervas et al. | Mar. 30, 1937 |
| 2,205,848 | Fischer | June 25, 1940 |
| 2,205,849 | Fischer et al. | June 25, 1940 |
| 2,268,936 | Hasler et al. | Jan. 6, 1942 |
| 2,353,569 | Knecht et al. | July 11, 1944 |
| 2,432,403 | Feliz et al. | Dec. 9, 1947 |

FOREIGN PATENTS

| Number | Country | Date |
| --- | --- | --- |
| 465,955 | Great Britain | May 18, 1937 |
| 498,879 | Great Britain | Jan. 12, 1939 |